United States Patent
Kitamura et al.

(10) Patent No.: US 10,401,920 B2
(45) Date of Patent: Sep. 3, 2019

(54) PORTABLE ELECTRONIC APPARATUS HAVING A PUSH BUTTON

(71) Applicant: LENOVO (SINGAPORE) PTE. LTD., Singapore (SG)

(72) Inventors: Masahiro Kitamura, Kanagawa-ken (JP); Mitsuo Horiuchi, Kanagawa-ken (JP); Eiji Shinohara, Kanagawa-ken (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 15/212,062

(22) Filed: Jul. 15, 2016

(65) Prior Publication Data
US 2017/0017267 A1    Jan. 19, 2017

(30) Foreign Application Priority Data
Jul. 16, 2015    (JP) ................. 2015-142406

(51) Int. Cl.
*G06F 1/16*    (2006.01)
*G06F 3/02*    (2006.01)
*G06F 3/0354*    (2013.01)

(52) U.S. Cl.
CPC ............ *G06F 1/169* (2013.01); *G06F 1/1662* (2013.01); *G06F 3/02* (2013.01); *G06F 3/03547* (2013.01);
(Continued)

(58) Field of Classification Search
CPC .......... G06F 1/169; G06F 3/02; G06F 1/1662; G06F 3/03547; G06F 2203/04105;
(Continued)

(56) References Cited

U.S. PATENT DOCUMENTS 6,281,887 B1 * 8/2001 Wang ................. G06F 3/03547
345/173
2002/0027062 A1  3/2002 Shibutani et al.
(Continued)

FOREIGN PATENT DOCUMENTS

CN    102053720 A    5/2011
CN    202230461 U    5/2012
(Continued)

OTHER PUBLICATIONS

Application No. EP16179116.5, European Search Report dated Apr. 25, 2017.
(Continued)

*Primary Examiner* — Temesghen Ghebretinsae
*Assistant Examiner* — Ivelisse Martinez Quiles
(74) *Attorney, Agent, or Firm* — Antony P. Ng; Russell Ng PLLC

(57) ABSTRACT

An electronic device is disclosed. The electronic apparatus has a board plate provided in a position apart from the operating direction of push buttons for receiving depressing operations. Detection switches for detecting the depressing operations of the push buttons are provided on the lower surface side of the board plate, and the push buttons are provided adjacent to the side part of the board plate and includes a vertically-movable operation surface part for receiving depressing operations and a detection arm, which protrudes from one edge part of the operation surface part to the lower surface side of the board plate and presses the detection switches by moving in the opposite direction to the direction of the vertical movement of the operation surface part.

3 Claims, 9 Drawing Sheets

(52) U.S. Cl.
CPC .............. *G06F 2203/04105* (2013.01); *H01H 2221/072* (2013.01); *H01H 2221/074* (2013.01); *H01H 2221/09* (2013.01); *H01H 2225/026* (2013.01)

(58) Field of Classification Search
CPC ...... G06F 1/16–1698; H01H 2225/026; H01H 2231/016; H01H 2221/09; H01H 2221/074; H01H 2221/072
See application file for complete search history.

(56) References Cited

U.S. PATENT DOCUMENTS

| | | | |
|---|---|---|---|
| 2009/0213069 A1 | 8/2009 | Kusaka | |
| 2010/0224471 A1* | 9/2010 | Sakai | H01H 13/7065 200/341 |
| 2011/0249383 A1* | 10/2011 | Horii | G06F 1/169 361/679.01 |
| 2012/0075199 A1* | 3/2012 | Hsieh | G06F 3/03547 345/173 |
| 2012/0182236 A1* | 7/2012 | Tsai et al. | G06F 1/169 345/173 |
| 2013/0050099 A1* | 2/2013 | Hirano | G06F 1/169 345/173 |
| 2014/0015754 A1* | 1/2014 | Chang | G06F 3/0362 345/168 |
| 2014/0116868 A1* | 5/2014 | Tsai | H01H 23/12 200/529 |
| 2016/0139637 A1* | 5/2016 | Doi | G06F 1/1679 361/679.4 |
| 2016/0147328 A1* | 5/2016 | Doi | G06F 1/169 345/157 |

FOREIGN PATENT DOCUMENTS

| | | | |
|---|---|---|---|
| CN | 103258678 A | 8/2013 | |
| CN | 103545125 A | 1/2014 | |
| EP | 1753001 A1 | 2/2007 | |
| EP | 1770733 A1 * | 4/2007 | ............ H01H 13/14 |
| JP | 61-056731 | 4/1986 | |
| JP | 06-333458 | 12/1994 | |
| JP | 08-335421 | 12/1996 | |
| JP | 2001184164 A | 7/2001 | |
| JP | 2003308166 A | 4/2002 | |
| JP | 2007-173111 | 7/2007 | |
| JP | 2014-086341 | 5/2014 | |

OTHER PUBLICATIONS

Application No. EP16179116.5, European Search Report dated Dec. 14, 2016.

* cited by examiner

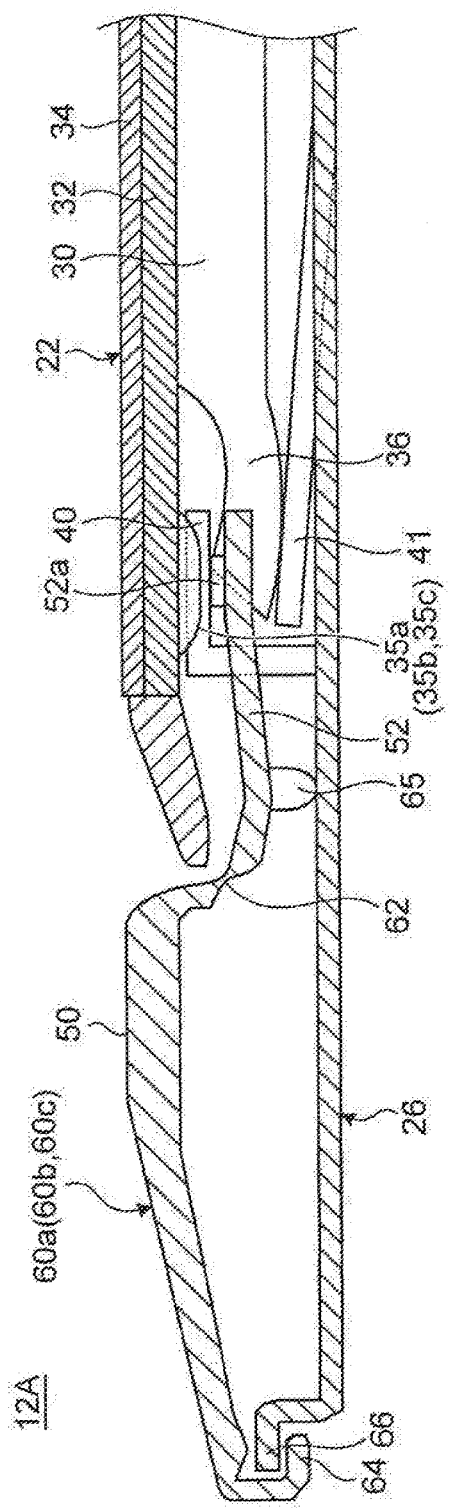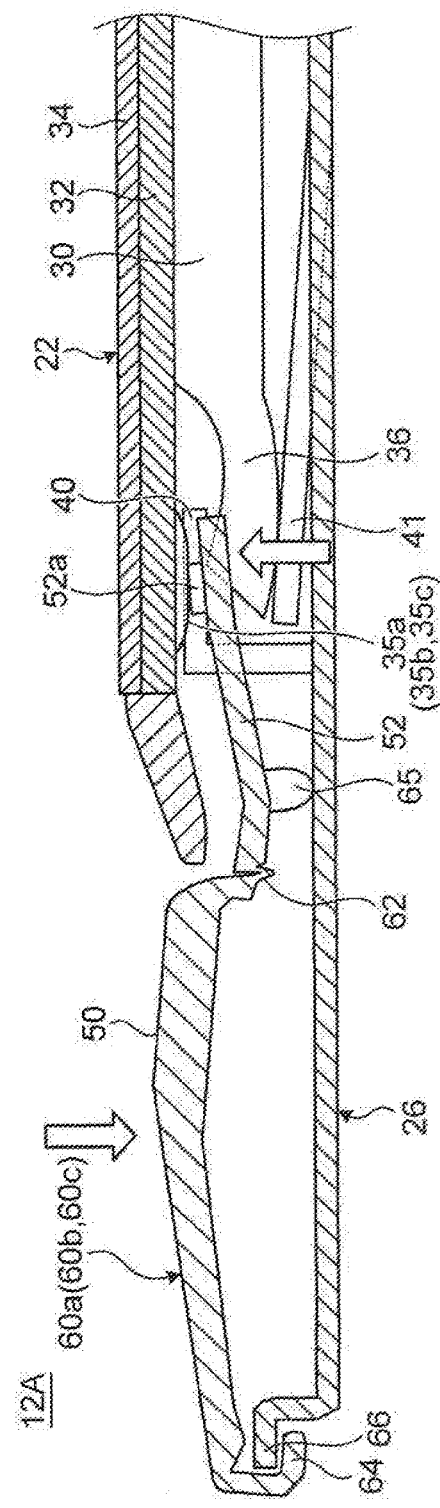

PORTABLE ELECTRONIC APPARATUS HAVING A PUSH BUTTON

PRIORITY CLAIM

The present application claims benefit of priority under 35 U.S.C. §§ 120, 365 to the previously filed Japanese Patent Application No. JP2015-142406 with a priority date of Jul. 10, 2015, which is incorporated by reference herein.

BACKGROUND OF THE INVENTION

1. Technical Field

The present invention relates to input devices in general, and particularly to an electronic apparatus provided with a push button for receiving a depressing operation.

2. Description of Related Art

An electronic apparatus such as a laptop personal computer (laptop PC), a tablet personal computer (tablet PC) or the like generally has a configuration in which a push button for receiving a depressing operation is provided in the side part of the electronic apparatus where an electronic board for a touch pad, a keyboard device, a display device are provided.

For example, a laptop PC that has a touch pad and a pointing stick used as a substitute for a mouse and is provided with push buttons on the front and rear side of the touch pad, where the push buttons serve as click operation buttons (mouse buttons) corresponding to the left and right mouse buttons by being used in combination with the touch pad and the pointing stick.

Conventionally, the push button generally has a configuration in which the push button is supported so as to be vertically movable by a supporting member having a pantograph structure, a rubber dome, or the like provided on the underside of the operation surface of the push button and a depressing operation is detected by a detection switch provided thereunder. Therefore, a large number of parts are required for vertically moving the push button and detecting the vertical movement thereof; thereby increasing cost, reducing manufacturing efficiency, and further leading to a barrier to reduction in thickness of the chassis of a laptop PC. Moreover, in the configuration in which a push button is provided in combination in the side part of a touch pad, it is necessary to connect a distribution cable from a detection switch provided under the push button to an electronic board for the touch pad, which makes it more difficult cost and thickness reduction.

SUMMARY OF THE INVENTION

In accordance with a preferred embodiment of the present invention, an electronic apparatus has a board plate provided in a position apart from the operating direction of push buttons for receiving depressing operations. Detection switches for detecting the depressing operations of the push buttons are provided on the lower surface side of the board plate, and the push buttons are provided adjacent to the side part of the board plate and includes a vertically-movable operation surface part for receiving depressing operations and a detection arm, which protrudes from one edge part of the operation surface part to the lower surface side of the board plate and presses the detection switches by moving in the opposite direction to the direction of the vertical movement of the operation surface part.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein:

FIG. 6A is a diagram illustrating a state where a push button is not depressed; and FIG. 6B is a diagram illustrating a state where the push button is depressed;

DETAILED DESCRIPTION OF A PREFERRED EMBODIMENT

Figure 1:
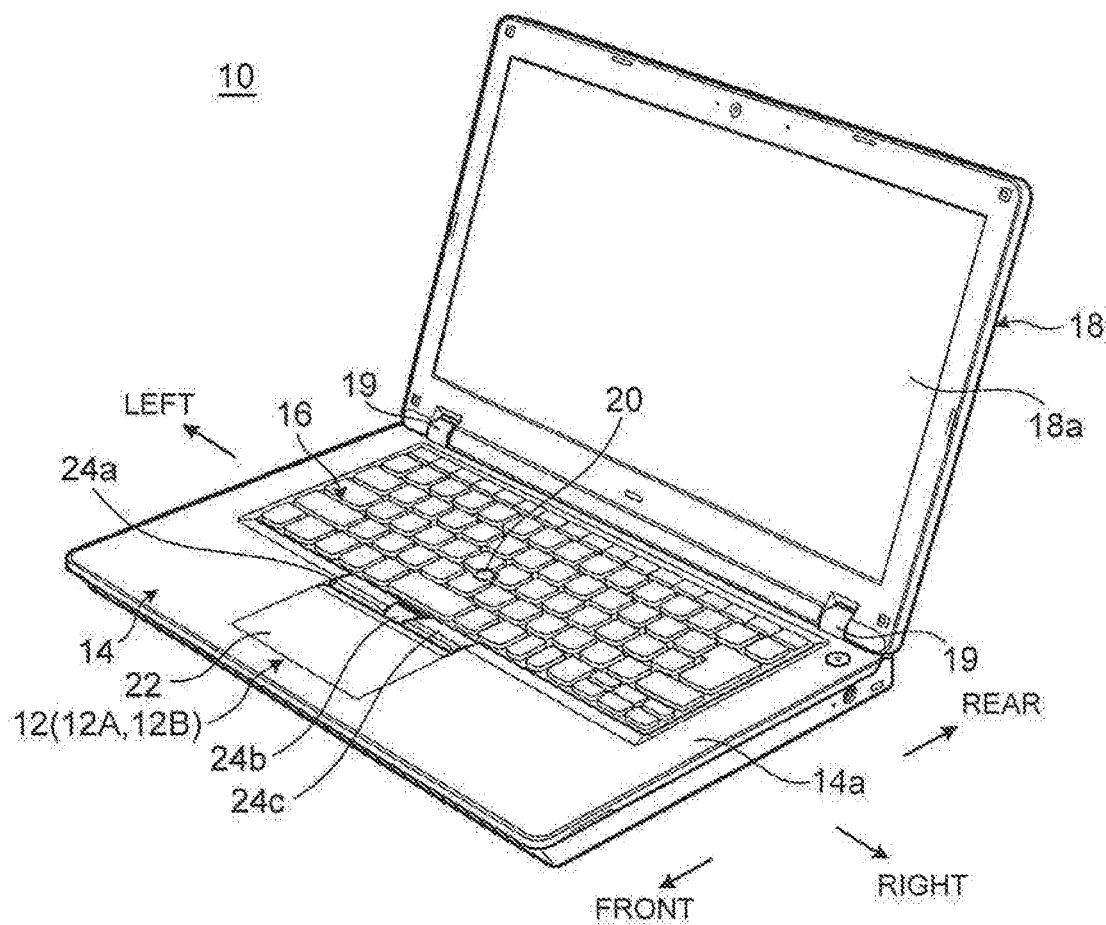
FIG. 1 is a perspective view of an electronic apparatus, according to one embodiment of the present invention.

Referring now to the drawings and in particular to FIG. 1, there is depicted a perspective view of an electronic apparatus 10, according to an embodiment of the present invention. In the following, with the use style illustrated in FIG. 1 as normal with respect to the electronic apparatus 10, the near side is referred to as "front side" (fore), the far side is referred to as 'rear side' (back), the thickness direction of a body chassis 14 constituting the electronic apparatus 10 is referred to as "vertical direction," and the width direction of the body chassis 14 is referred to as "horizontal direction" in the description of the electronic apparatus 10.

As illustrated in FIG. 1, the electronic apparatus 10 is a laptop PC including the body chassis 14 having an input, device 12 and a keyboard device 16 and a display housing 18 having a display device 18a such as a liquid crystal display. The display housing 18 is connected to the body chassis 14 through a pair of right and left hinges 19 and 19 so as to be opened and closed.

The body chassis 14 houses various electronic components, which are not illustrated, such as a board, an arithmetic processing unit, a hard disk device, a memory, and the like. The input device 12 and the keyboard device 16 are arranged in the front and rear direction on the upper surface 14a of the body chassis 14. Substantially in the center of the keyboard device 16, a pointing stick 20 is provided. The pointing stick 20 is for use in operating a cursor (a mouse pointer) displayed on the display device 18a and is an input means operable as a substitute for a mouse.

Subsequently, an example of the configuration of the input device 12 will be described.

Figure 2:
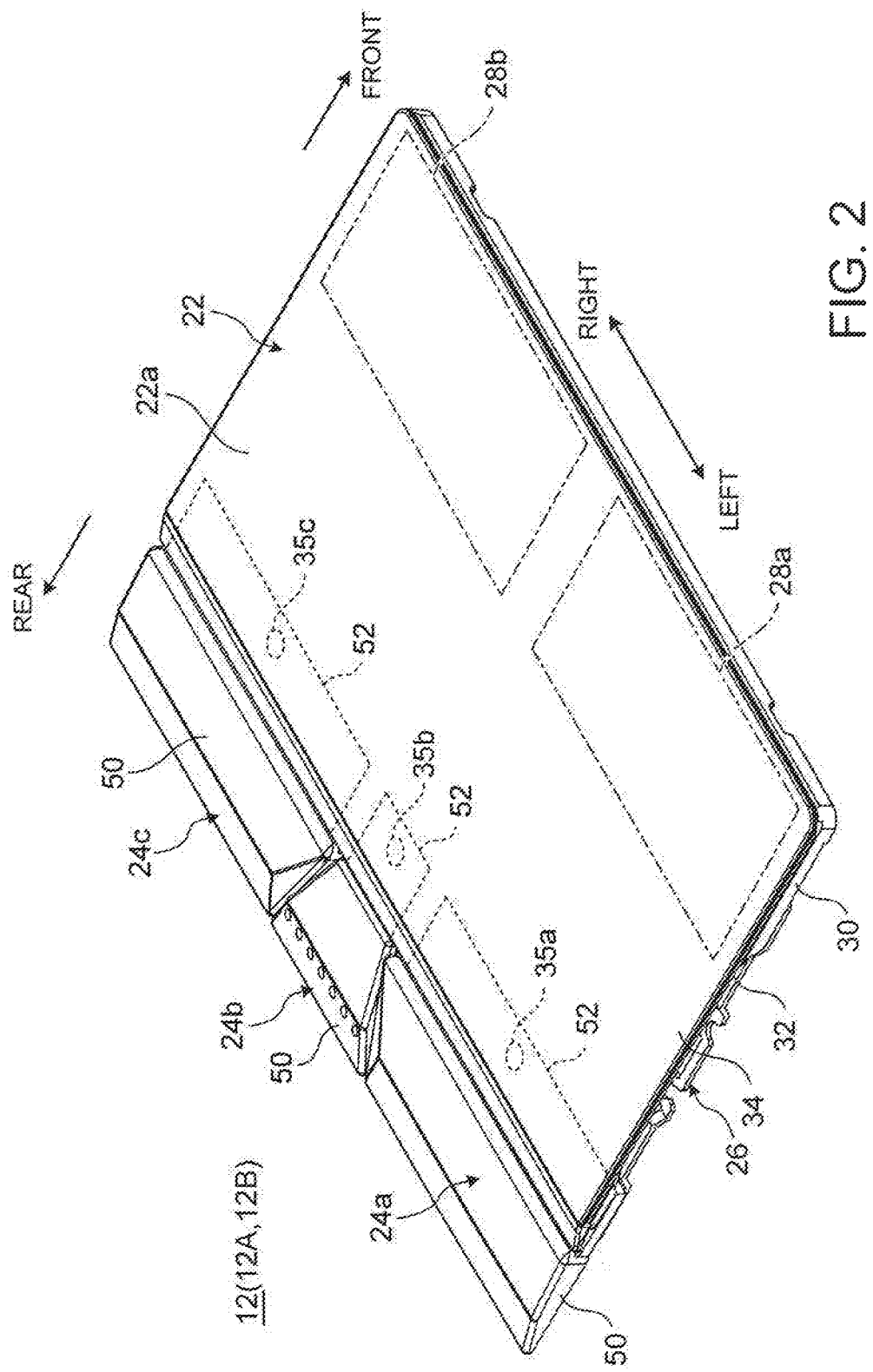
FIG. 2 is a perspective view of an input device mounted on the electronic apparatus, according to one embodiment of the present invention.
Figure 3:
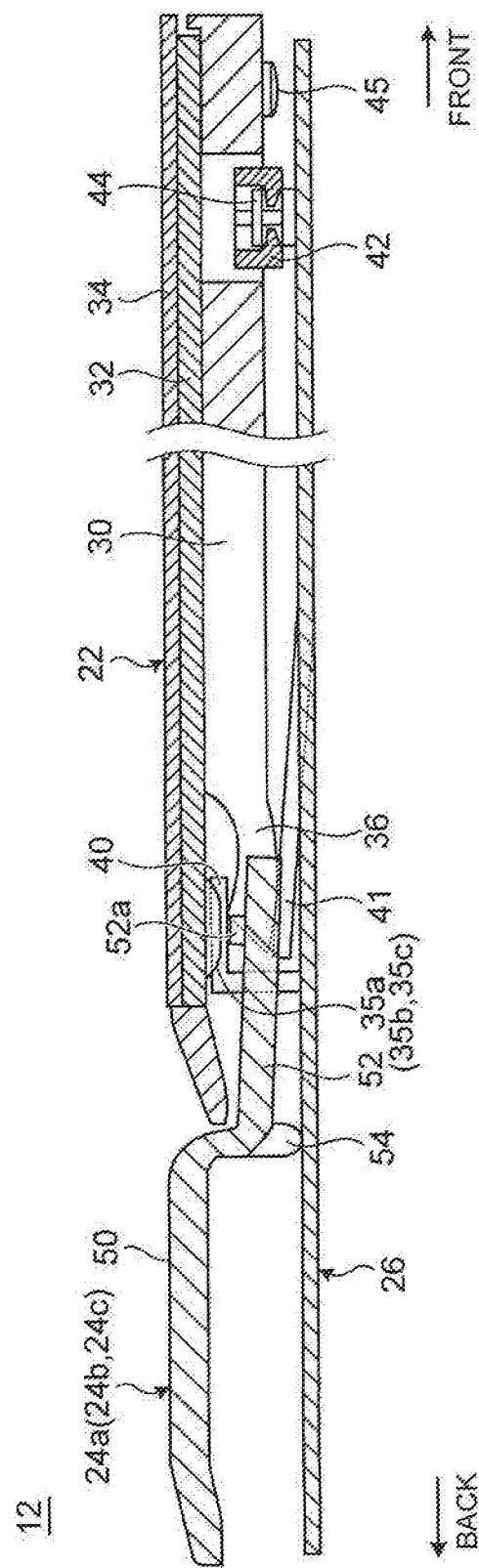
FIG. 3 is a cross-sectional side view illustrating the configuration of the input device illustrated in FIG. 2.
Figure 4:
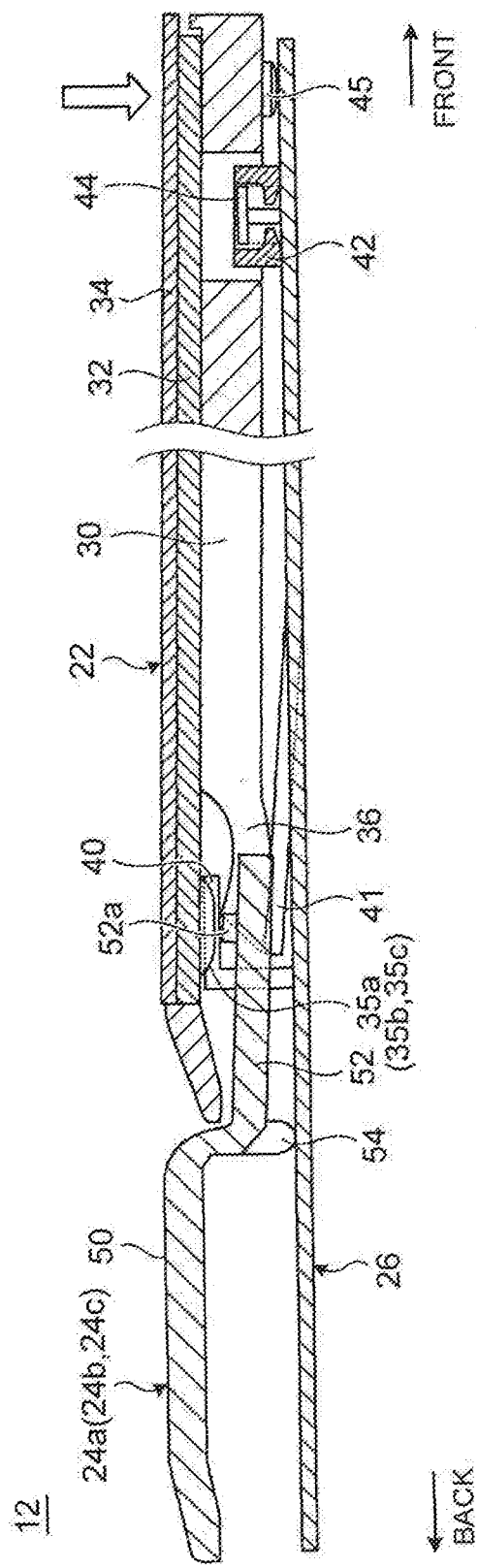
FIG. 4 is a diagram illustrating a state where a touch pad of the input device illustrated in FIG. 3 is depressed.
Figure 5:
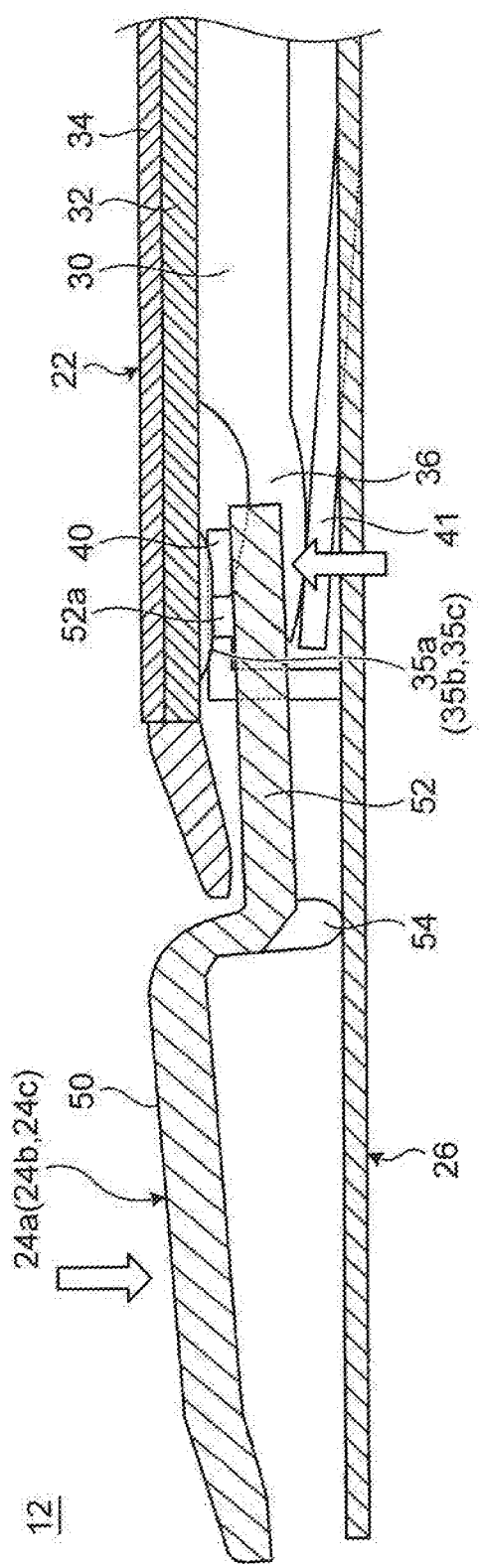
FIG. 5 is an enlarged view illustrating a state where the push button illustrated in FIG. 3 is depressed.

FIG. 2 is a perspective view of the input device 12 mounted on the electronic apparatus 10, according to an embodiment of the present invention. FIG. 3 is a sectional side view illustrating the configuration of the input device 12 illustrated in FIG. 2. FIG. 4 is a diagram illustrating a state where a touch pad 22 of the input device 12 illustrated in FIG. 3 is depressed. Furthermore, FIG. 5 is an enlarged view illustrating a state where a push button 24a illustrated in FIG. 3 is depressed.

As illustrated in FIGS. 1-3, the input device 12 includes a touch pad (an operation-input part) 22 for receiving a touch operation through the approach, contact, or the like of a fingertip or the like and three push buttons 24a, 24b, and 24c arranged along the rear side part of the touch pad 22. As illustrated in FIGS. 2-3, the touch pad 22 and the push buttons 24a to 24c are supported by the upper surface of a baseplate 26 that is a metallic plate-like member.

First, the touch pad 22 is formed as a click pad on which a click action can be performed by a depressing operation in addition to the touch operation.

As illustrated in FIG. 2, pseudo button areas 28a and 28b are set in the front side of the touch operation surface 22a, which is a surface of the touch pad 22. The pseudo button areas 28a and 28b are defined by coordinates with respect to the respective areas on the touch operation surface 22a and therefore are invisible. If the touch pad 22 is depressed with a fingertip in contact with one of the pseudo button areas 28a and 28b, processing or display corresponding to the pseudo button area 28a or 28b is performed, For example, the two pseudo button areas 28a and 28b correspond to the left and right buttons in a general mouse.

As illustrated in FIG. 3, the touch pad 22 has a three-layer structure having a housing plate 30 that serves as a bottom surface plate arranged opposite to the baseplate 26, a board plate 32 that is laminated on the upper surface of the housing plate 30 to detect a touch operation on the touch operation surface 22a, and a pad plate 34 which is laminated on the top of the board plate 32 so that the surface thereof serves as a touch operation surface 22a for receiving the touch operation.

The board plate 32 is an electronic board having a rectangular shape in a plan view and is connected to a board in the body chassis 14 by wiring not illustrated. The board plate 32 is a sensor for detecting a touch operation on the pad plate 34 and a depressing operation on the touch pad 22 and also a sensor for detecting a depressing operation on the push buttons 24a to 24c.

On the lower surface on the rear end side of the board plate 32, detection switches 35a to 35c for detecting a depressing operation of the push buttons 24a to 24c are aligned in the horizontal direction (see FIGS. 2-3). The detection switches 35a to 35c are for example, metal dome switches swollen from the lower surface of the board plate 32 and are exposed downward from a notched portion of the housing plate 30. The detection switches 35a to 35e are turned on by being pressed by a detection arm 52 for the push buttons 24a to 24c described later when the push buttons 24a to 24e are depressed and the board plate 32 detects the ON signal.

The pad plate 34 is a glass or resin plate having a rectangular shape in a plan view and is fixed to the upper surface of the board plate 32 by using an adhesive, a double-sided tape, or the like.

The housing plate 30 is a resin plate having a rectangular shape in a plan view and is a chassis member for bolding the board plate 32 and the pad plate 34. The board plate 32 is fixed to the upper surface of the housing plate 30 by using an adhesive, a double-sided tape, or the like.

On the rear end side of the housing plate 30, there is provided an elastic nail 36 having a cantilever structure which extends backward and is provided with a certain degree of elasticity. The elastic nail 36 is not fixed to the lower surface of the board plate 32 and is disposed with a predetermined gap provided between at least the tip thereof and the board plate 32, by which a protruding piece 40 formed by cutting and raising the upper surface of the baseplate 26 is put between the upper surface of the elastic nail 36 and the lower surface of the board plate 32. Under the protruding piece 40, a leaf-spring-type elastic pressing part 41, which is formed on the upper surface of the baseplate 26, is arranged, so that the elastic nail 36 of the housing plate 30 is put between the elastic pressing part 41 and the protruding piece 40. The elastic nail 36, the protruding piece 40, and the elastic pressing part 41 are aligned in the horizontal direction.

A pair of latch parts 42 are provided in the horizontal direction on the front end side of the housing plate 30. Each latch part 42 has substantially V-shape in as plan view and is engaged with a coupling hook 44 that is formed upright in L shape in cross-section on the upper surface of the baseplate 26. The latch part 42 and the coupling hook 44 are portions for coupling the housing plate 30 to the baseplate 26 in a direction where the housing plate 30 is put on the baseplate 26 and also function as a stopper for preventing upward coming-off while setting the rising limit of the touch pad 22.

Each elastic nail 36 is rotatably engaged with each protruding piece 40 (and each elastic pressing part 41) of the baseplate 26, by which the housing plate 30 is rotatable with respect to the baseplate 26 with the engagement part as a rotating supporting point (see FIG. 4).

As illustrated in FIG. 3, in the vicinity of the front end substantially in the center of the lower surface of the housing plate 30, a click detection switch 45 is disposed. The click detection switch 45 is used to transmit a predetermined detection signal when the touch pad 22 is depressed. The click detection switch 45 is, for example, a metal dome switch swollen from the lower surface of the housing plate 30. The click detection switch 45 is turned on by abutting on the baseplate 26 when the touch pad 22 is depressed and the board plate 32 detects the ON signal.

Therefore, when the touch operation surface 22a of the touch pad 22 is depressed as illustrated in FIG. 4, the front portion of the touch pad 22 is pushed down with the engagement part between the elastic nail 35 of the housing plate 30 and the protruding piece 40 of the baseplate 2 as a rotating supporting point, by which the click detection switch 45 is turned on.

The push buttons 24a to 24c function in cooperation with a cursor operation through the pointing stick 20 or the touch pad 22 and are click operation buttons corresponding to the left, middle, and right buttons in a general mouse, respectively. The push buttons 24a to 24c may be arranged in the front side part or the right and left parts of the touch pad 22 or may be arranged with a frame of the body chassis 14 interposed between the push buttons 24a to 24c and the touch pad 22.

As illustrated, in FIGS. 2-3, the push button 24a on the left side includes a vertically-movable operation surface part 50 which receives a depressing operation and a detection arm 52 protruding forward from the front edge part of the operation surface part 50. The push button 24c on the right side has substantially the same structure since the push button 24c is bilaterally symmetrical with respect to the push button 24a on the left, side. Although the push button 24b in the center is different in the shape and size from the push buttons 24a and 24, the push button 24b has substantially the same structure as the push buttons 24a and 24c in the structure of the vertical movement with respect to the depressing operation on the push button. Therefore, with respect to these push buttons 24h and 24c, the same reference numerals denote elements having the same or similar functions or effects as or to the respective elements of the push button 24a and detailed description is omitted here.

The operation surface part 50 is a button part provided adjacent to the rear side part of the touch pad 22. The operation surface part 50 is able to be satisfactorily depressed by the thumb, for example, while operating the pointing stick 20 by the index finger due to the provision of an inclined surface extending downward to the rear in the rear end part of the operation surface part 50. The detection arm 52 protrudes downward to the front from the front edge part of the operation surface part 50, by which the detection arm 52 is inserted into the lower surface side of the touch pad 22. A protrusive pressing part 52b is provided on the upper surface of the tip side (the front end side) of the detection arm 52, where the protrusive pressing part 52a for use in pressing a detection switch 35a of the board plate 32. Naturally, the upper surface of the detection arm 52 may be used as a pressing part without the provision of the protrusive pressing part 52a.

The push button 24a has a seesaw structure in which a rotating shaft part 54 serving as a rotating supporting point of the push button 24a is provided in a position between the operation surface part 50 and the pressing part 52b of the detection arm 52, or the connecting part between the operation surface part 50 and the detection arm 52 in this embodiment. The rotating shaft part 54 is a protruding part which protrudes downward from the connecting part between the operation surface part 50 and the detection arm 52 with the tip getting down on the upper surface of the baseplate 26. Alternatively, the rotating shaft part 54 may be provided on the baseplate 26 side so as to protrude upward from the upper surface of the baseplate 26 to support the push button 24a.

As illustrated in FIGS. 3-4, the push button 24a is rotatably supported on the baseplate 26 by the rotating shaft part 54 getting down on the baseplate 26 and the detection arm 52 being inserted into the gap between the baseplate 26 and the touch pad 22 (the board plate 32).

As illustrated in FIG. 5, when the operation surface part 50 of the push button 24a (24b, 24c) is depressed, the operation surface part 50 is pushed downward with the rotating shaft part 54 as a rotating supporting point, while the detection arm 52 which is opposite the rotating shaft part 54 is pushed in the opposite direction to the direction of the operation surface part 50, in other words, in the upward direction. Thereby, the pressing part 52a presses the detection switch 35a (35b, 35c) on the lower surface of the board plate 32, by which the detection switch 35a (35b, 35c) is turned on.

Specifically, the detection arm 52 is able to press the detection switch 35a (35b, 35c) on the tower surface of the board plate 32 since the moving direction of the detection arm 52 is opposite to the direction of the vertical movement of the operation surface part 50. Therefore, the rotating shaft part 54 serving as a rotating supporting point of the push button 24a (24b, 24c) may be set in a position where the operation surface part 50 and the pressing part 52a can be vertically moved in directions opposite to each other like a seesaw, in other words, a position between the operation surface part 50 and the pressing part 52a of the detection arm 52.

As described hereinabove, in the electronic apparatus 10 according to this embodiment, the board plate 32 is provided with the detection switch 35a (35b, 35c) for detecting a depressing operation of the push button 24a (24b, 24c) in a configuration where the board plate 32, which is an electronic board, is provided in a position apart from the operating direction of the push button 24a (24b, 24c) for receiving a depressing operation, specifically, in a position outside the vertical movement range of the push button 24a (24b, 24c).

Therefore, it is unnecessary to provide a detection switch, a rubber dome for assisting the pressing operation thereof, or the like under the operation surface part 50 of the push button 24a (24b, 24c) and further unnecessary to connect to distribution cable or the like from the detection switch to the board plate 32. Specifically, since the adjacent board plate 32 serves as the detection switch 35a (35b, 35c) of the push button 24a (24b, 24c), the detection switch, the distribution cable, and the like can be removed from under the push button 24a (24b, 24c), thereby improving the manufacturing efficiency by reducing the number of parts and enabling reduction in cost and thickness. In other words, a space is able to be secured under the operation surface part of the push button 24a (24b, 24c). Therefore, it is also possible to install any other apparatus such as a battery for the electronic apparatus 10 by cutting out the baseplate 26 in this apace or the like.

The detection switch 35a (35b, 35c) is provided on the lower surface side of the board plate 32 and the push button 24a (24b, 24c) is provided adjacent to the side part of the board plate 32. The push button 24a (24b, 24c) includes the vertically-movable operation surface part 50, which receives a depressing operation, and a detection arm 52, which protrudes front one edge part of the operation surface part 50 to the lower surface side of the board plate 32 and presses the detection switch 35a (35b, 35c) by moving in the opposite direction to the direction of the vertical movement of the operation surface part 50. Accordingly, a depressing operation of the operation surface part 50 causes the detection arm 52 to move in the opposite direction to the direction of the operation surface part 50, thereby enabling reliable turning on or off of the detection switch 35a (35b, 35c), which is provided on the lower surface side of the board plate 32, with the detection arm 52 by depressing the operation surface part 50.

In this case, the push button 24a (24b, 24c) has a rotating shaft part 54 serving as a rotating supporting point in a position between the operation surface part 50 and the pressing part 52a for pressing the detection switch 35a (35b, 35c) of the detection arm 52. Accordingly, a depressing operation of the operation surface part 50 causes the pressing part 52a of the detection arm 52 to move in the opposite direction to the direction of the operation surface part 50 reliably, thereby enabling, more reliable turning on or off of the detection switch 35a (35b, 35c).

In this embodiment, the axial direction of the rotating shaft part 54, which serves as a rotating supporting point of the push button 24a (24b, 24c), and the axial direction of the rotating supporting point (an engagement part between the elastic nail 36 and the protruding piece 40) of the touch pad 22 are parallel to each other in the horizontal direction (see FIGS. 3-5). When viewed in the axial direction (horizontal direction) of the rotating supporting point of the touch pad 22, the rotating supporting point of the touch pad 22 and the detection switch 35a (35b, 35c) are arranged in positions where both overlap with each other. Specifically, the detection switch 35a (35b, 35c) is disposed to the side of the engagement part between the elastic nail 36 serving as a rotating supporting point of the touch pad 22 and the protruding piece 40. This prevents interference between the depressing operations of the push button 24a (24b, 24c) and the touch pad 22. Specifically, when the push button 24a (24b, 24c) is depressed, the touch pad 22 is prevented from being erroneously operated by moving following the depressing operation. Meanwhile, when the touch pad 22 is depressed, the push button 24a (24b, 24c) is prevented from being erroneously operated by moving following the depressing operation.

FIG. 6 is a sectional side view illustrating the configuration of an input device 12A according to a variation of the input device 12 mounted on the electronic apparatus 10 illustrated in FIG. 1: FIG. 6A is a diagram illustrating a state where a push button 60a is not depressed; and FIG. 6B is a diagram illustrating a state where the push button 60a is depressed.

As illustrated in FIGS. 6A-6B, the input device 12A includes push buttons 60a to 60c having a different structure from the push buttons 24a to 24c of the input device 12 illustrated in FIGS. 3 and 5. Also in the input device 12A, the structure of vertical movement relative to the depressing operation or the like is substantially identical with respect to the push buttons 60a to 60c. Therefore, detailed description of the push buttons 60b and 60c are omitted here.

As illustrated in FIG. 6A, the push button 60a has a structure where the operation surface part 50 is connected to the detection arm 52 via a hinge part 62 with a first rotating, shaft part 64 provided in the rear end edge part of the operation surface part 50 and with a second rotating shaft part 65 provided on the rear end side of the detection arm 52. The first rotating shaft part 64 is formed by folding hack the rear end edge part of the operation surface part 50 and rotatably engaged with a hook-shaped supporting piece 66 which is formed in a standing manner in the rear end edge part of the baseplate 26, thereby serving us a rotating supporting point (a first rotating supporting point) of the operation surface part 50. A second rotating shall part 65 is a protruding part which protrudes downward from the position between the hinge part 62 and the pressing part 52a of the detection arm 52, or in the position on the rear end side of the detection arm 52 in this embodiment with the tip getting down on the upper surface of the baseplate 26. Alternatively, the second rotating shaft part 65 may be provided on the baseplate 26 side so as to protrude upward from the upper surface of the baseplate 26 to support the push button 24a.

The hinge part 62 is a portion functioning as a direction change part which changes the moving directions of the operation surface part 50 and the detection arm 52 and is formed by, for example, a flexible resin sheet.

The push button 60a has a configuration where the operation surface part 50 and the detection arm 52 vertically move by using two rotating supporting points, the first rotating shaft part 64 provided on the rear side of the operation surface part 50 and the second rotating shaft part 65 provided on the front side thereof. Specifically, as illustrated in FIG. 6B, when the operation surface part 50 of the push button 60a (60b, 60c) is depressed, the front end side of the operation surface part 50 is pushed downward with the first rotating shaft part 64 as a rotating supporting point, while the rear end side of the detection arm 52 is pushed down by the hinge part 62 together with the operation surface part 50, by which the front end side of the detection arm 52 is pushed in the opposite direction to the direction of the operation surface part 50, in other words, in the upward direction with the second rotating shaft part 65 as a rotating supporting point. Thereby, the pressing part 52a presses the detection switch 35a (35b, 35c) on the lower surface of the board plate 32, by which the detection switch 35a (35b, 35c) is turned on.

Also in the case of the push button 60a (60b, 60c), the detection arm 52 is able to press the detection switch 35a (35b, 35c) on the lower surface of the board plate 32 since the moving direction of the detection arm 52 is opposite to the direction of the vertical movement of the operation surface part 50. Therefore, the rotating shaft part 64 serving as the first rotating supporting point of the push button 60a (60b, 60c) may be set in a position on the rear side of the front edge part where the detection arm 52 of the operation surface part 50 is provided. In addition, the rotating shaft part 65 serving as the second rotating supporting point may be set in a position between the operation surface part 50 and the pressing part 52a of the detection arm 53 and the hinge part 62 may be set in a position between the two rotating shaft parts 64 and 65.

Therefore, also in the configuration including the push button 60a (60b, 60c) provided with this type of hinge part 62, cost and thickness can be reduced in the same manner as the configuration including the aforementioned push button 24a (24b, 24c). In addition, in the push button 60a (60b, 60c), the moving directions of the operation surface part 50 and the detection arm 52 are changed at the hinge part 62 serving as a direction change part. Therefore, also in the case of setting the depressed position of the operation surface part 50 on the detection arm 53 side (the front end side) as illustrated in FIG. 6, the detection switch 35a (35b, 35c) can be reliably turned on and off.

Figure 7:
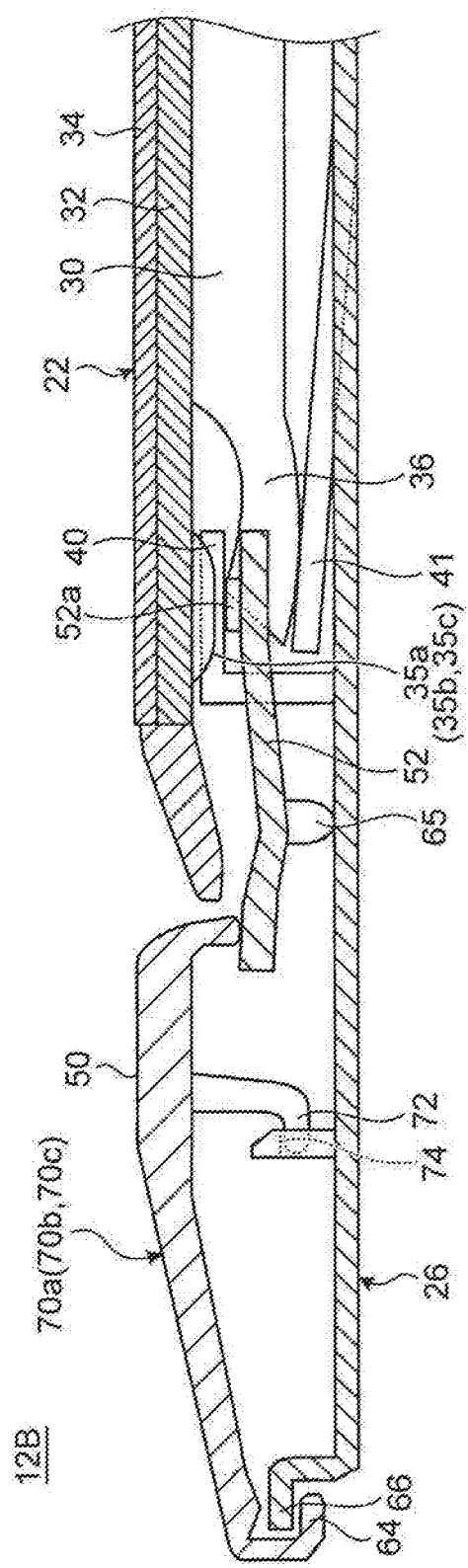
FIG. 7 is a sectional side view illustrating the configuration of an input device according to a variation of the input device illustrated in FIGS. 6A-6B.

FIG. 7 is a sectional side view illustrating the configuration of an input device 129 according to a variation of the input device 12A illustrated in FIG. 6. As illustrated in FIG. 7, the input device 129 includes push buttons 70a to 70c different in the structure from the push buttons 60a to 60c of the input device 12A illustrated in FIG. 6. This push button 70a (70b, 70c) does not have a hinge part 62 between the operation surface part 50 and the detection arm 52, with the front end part of the operation surface part 50 arranged abutting on the rear end part of detection arm 52 in a state where the front end part is able to depress the rear end part.

Therefore, also in the case of the push button 70a (70b, 70c), when the operation surface part 50 is depressed, the front end side of the operation surface part 50 is pushed downward with the first rotating shaft part 64 as a rotating supporting point, while the rear end side of the detection arm 52 is pushed down by the front end part of the operation surface part 50, by which the front end side of detection arm 52 is pushed in the opposite direction to the direction of the operation surface part 50, in other words, in the upward direction with the second rotating shaft part 65 as a rotating supporting point. Thereby, the pressing part 52a presses the detection switch 35a (35b, 35c) on the lower surface of the board plate 32, by which the detection switch 35a (35b, 35c) is turned on. Specifically, the contact position between the front end part of the operation surface part 50 and the rear end part of the detection arm 52 corresponds to a direction, change part which changes the moving directions of the operation surface part 50 and the detection arm 52.

Therefore, in the configuration including the push button 70a (70b, 70c), the moving directions of the operation surface part 50 and the detection arm 52 can be made opposite to each other without providing the hinge part 62 between the operation surface part 50 and the detection arm 52, thereby enabling the component structure to be simplified.

It, however, should be noted that the front end side of the operation surface part 50 easily comes of upward in the case of the push button 70*a* (70*b*, 70*c*) and therefore, as illustrated in FIG. 7, there may be used a configuration were an engagement hook 72 is provided in a protruding condition on the lower surface (the rear surface) of the operation surface part 50 and the engagement hook 72 is engaged with an engagement hole 74, which is formed upright in a gate shape, on the upper surface of the baseplate 26, so that the engagement hook 72 and the engagement hole 74 function as a stopper for preventing upward coming-off while setting the rising limit of the push button 70*a* (70*b*, 70*c*). Naturally, the coming-off prevention structure composed of the engagement hook 72 and the engagement hole 74 may be applied to the operation surface part 50 of the aforementioned push buttons 24*a* to 24*c* and 60*a* to 60*c* since the structure is simple and can be easily reduced in size.

Figure 8:
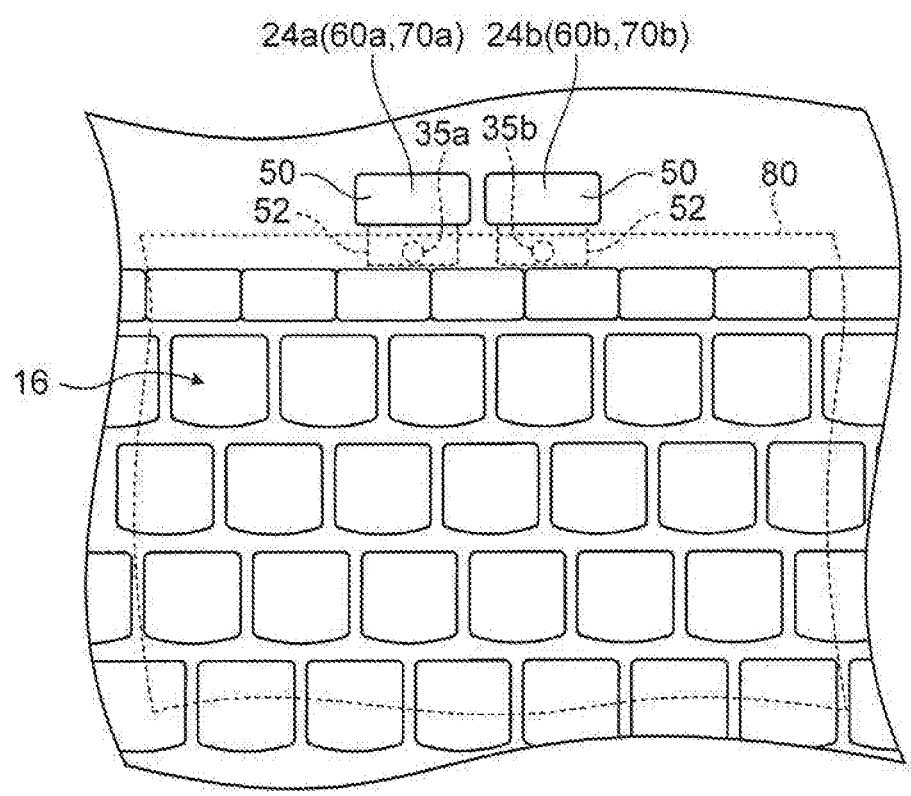
FIG. 8 is a diagram illustrating a configuration in which a detection switch for the push button is provided on the electronic board of a keyboard device.
Figure 9:
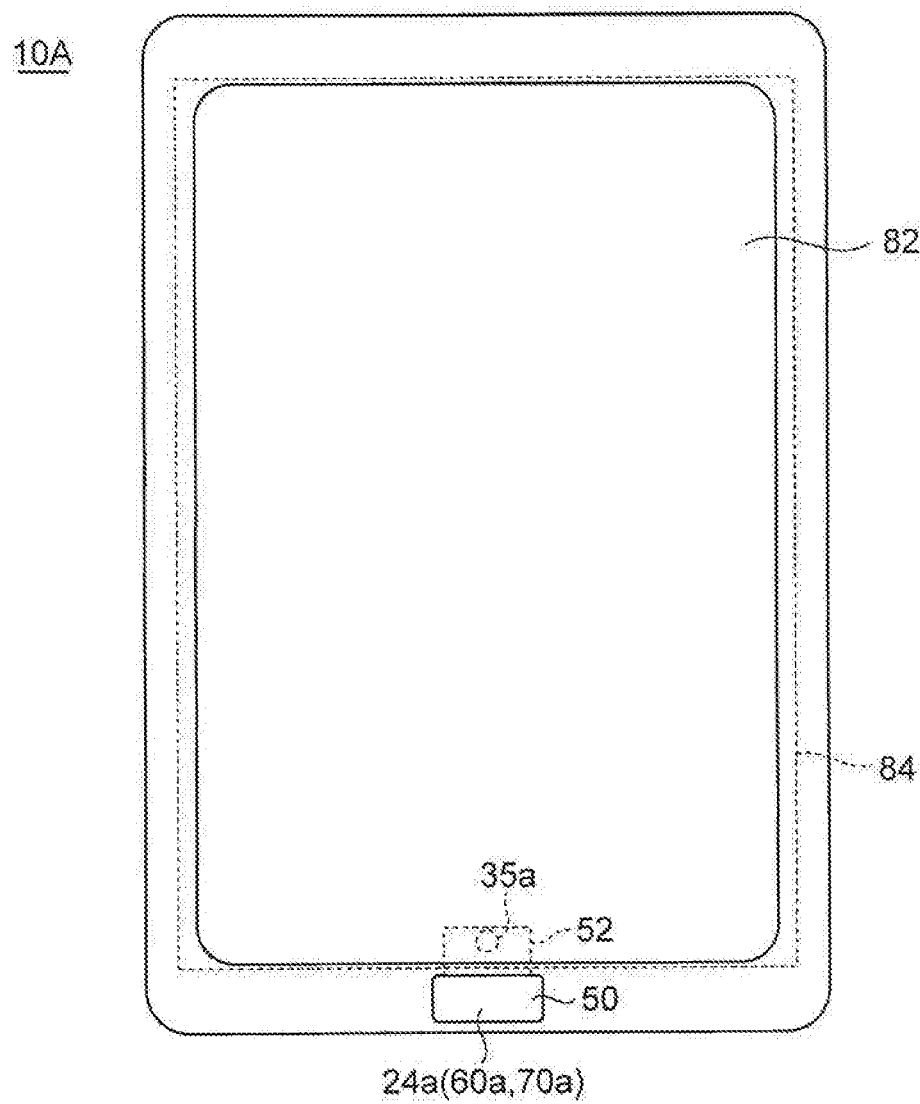
FIG. 9 is a diagram illustrating a configuration in which a detection switch for the push button is provided on an electronic board of a display device for a tablet PC.

Although the above embodiments illustrate a configuration in which the detection switch 35*a* and the like for detecting a depressing operation of the push button 24*a* and the like provided on the side part of the touch pad 22 are provided on the board plate 32 on the touch pad 22 side, it is also possible to dispose, for example, the push buttons 24*a* and 24*b* on the side part of the keyboard device 16 as illustrated in FIG. 8 and to provide the detection switches 35*a* and 35*b* on an electronic hoard 80 for detecting key operations on the keyboard device 16. Furthermore although the electronic apparatus 10 which is a laptop PC is illustrated in the above embodiments, the present invention may be applied to an electronic apparatus 10A which is a tablet PC as illustrated in FIG. 9. In this electronic apparatus 10A, it is also possible to use the present invention having a configuration where, for example, the push button 24*a* is disposed in the side part of a display device 82 and the detection switch 35*a* for the push button 24*a* is provided on an electronic board 84 for detecting touch operations on the display device 82. Furthermore, the present invention is applicable to various types of electronic apparatus such as a smartphone, an electronic organizer, a pen-type input means (a pen tablet) where an input operation is performed on a touch operation surface by using a pen-type device, and the like.

While the disclosure has been particularly shown and described with reference to a preferred embodiment, it will be understood by those skilled in the art that various changes in form and detail may be made therein without departing from the spirit and scope of the disclosure.

What is claimed is:

1. An electronic apparatus comprising:
   a touch pad having a board plate located adjacent to said touch pad;
   a baseplate located opposite of said board plate, wherein said baseplate includes a protruding piece and an elastic pressing part, both resting on a surface of said baseplate, wherein said board plate is attached to a house plate having an elastic nail located between said protruding piece and said elastic pressing part to support depressing operations of said touch pad;
   a first detection switch is provided on a surface of said board plate facing said baseplate, wherein said first detection switch detects said depressing operations of said touch pad;
   a push button separate from said touch pad, wherein said push button includes a vertically movable operation surface for receiving depressing operation, a detection arm located in a gap between said board plate and said baseplate, and a rotating shaft part located at a junction of said vertically movable operation surface and said detection arm, wherein said rotating shaft part rests on said surface of said baseplate; and
   a second detection switch for detecting said depressing operations of said push button, wherein said second detection switch is provided on said surface of said board plate facing said baseplate, wherein said detection switch is pressed by said detection arm of said push button moving in an opposite direction to a movement direction of said vertically movable operation surface of said push button.

2. An electronic apparatus comprising:
   a touch pad having a board plate located adjacent to said touch pad;
   a baseplate located opposite of said board plate, wherein said baseplate includes a protruding piece and an elastic pressing part, both resting on a surface of said baseplate, wherein said board plate is attached to a house plate having an elastic nail located between said protruding piece and said elastic pressing part to support depressing operations of said touch pad;
   a first detection switch is provided on a surface of said board plate facing said baseplate, wherein said first detection switch detects said depressing operations of said touch pad;
   a push button, separate from said touch pad, for receiving depressing operations, wherein said push button includes a hook and a vertically movable operation surface, wherein said hook is connected to an engagement hole attached to said baseplate;
   a detection arm located between said board plate and said baseplate, wherein said detection arm is selectively connected to said push button, wherein said detection arm rests on said baseplate vi a rotating shaft part; and
   a second detection switch for detecting said depressing operations of said push button, wherein said second detection switch is provided on said surface of said board plate facing said baseplate, wherein said detection switch is pressed by said detection arm moving in an opposite direction to a movement direction of said vertically movable operation surface.

3. An electronic apparatus comprising:
   a display housing having a display device;
   a body chassis pivotally connected to said display housing, wherein said body chassis having a keyboard device and an input device that includes
      a touch pad having a board plate located adjacent to said touch pad;
      a baseplate located opposite of said board plate, wherein said baseplate includes a protruding piece and an elastic pressing part, both resting on a surface of said baseplate, wherein said board plate is attached to a house plate having an elastic nail located between said protruding piece and said elastic pressing part to support depressing operations of said touch pad;
      a first detection switch is provided on a surface of said board plate facing said baseplate, wherein said first detection switch detects said depressing operations of said touch pad;
      a push button separate from said touch pad, wherein said push button includes a vertically movable operation surface for receiving depressing operation, a detection arm located in a gap between said board plate and said baseplate, and a rotating shaft part located at a junction of said vertically movable operation surface and said detection arm, wherein said rotating shaft part rests on said surface of said baseplate; and a second detection switch for detecting said depressing operations of said push button, wherein said second detection switch is provided on said surface of said board plate facing said baseplate, wherein said detection switch is pressed by said detection arm of said push button moving in an opposite direction to a movement direction of said vertically movable operation surface of said push button.

* * * * *